Jan. 2, 1968 D. W. MOYER ETAL 3,360,934
HYDROSTATIC TRANSMISSION DUAL PRESSURE CHARGE-SERVO SYSTEM
Filed May 6, 1966 2 Sheets-Sheet 2

Inventors:
Donald W. Moyer
Raymond D. Rubenstein
Raymond H. Smith, Jr.
By Walter G. Greavy
Atty.

United States Patent Office 3,360,934
Patented Jan. 2, 1968

3,360,934
HYDROSTATIC TRANSMISSION DUAL PRESSURE CHARGE-SERVO SYSTEM
Donald W. Moyer, Downers Grove, Raymond D. Rubenstein, La Grange Park, and Raymond H. Smith, Jr., Lockport, Ill., assignors to International Harvester Company, Chicago, Ill., a corporation of Delaware
Filed May 6, 1966, Ser. No. 548,184
9 Claims. (Cl. 60—53)

This invention relates to hydrostatic transmissions for vehicles, but more particularly to the hydraulic circuitry and the arrangement of associated components in such circuitry when employed in transmissions of this character.

In hydrostatic transmissions of the type incorporated in vehicles it is well known that the higher the pressure used the greater the leakage of fluid in the charge circuit of the motor-pump unit thereof, hence because of this and for other well known reasons such as complicating structural loading problems it is desirable to provide the fluid supplied for charge or make-up at the lowest possible pressure, while at the same time supplying fluid at the highest possible pressure to servo-cylinder devices employed for controlling the swash plate operation of the unit in order to provide for the most compact design of such devices. This, of course, necessitates the use of either a plurality of hydraulic supply pumps to provide the different pressures, or pressure reducing equipment with a single hydraulic supply pump operated at the higher of these pressures to obtain optimum pressure for each fluid supply. When a single supply pump is utilized it has to supply a large flow requirement at a pressure high enough to operate the servos and then either utilize pressure reducing equipment to obtain the supply of the larger flow required at the lower pressure desired for charge or make-up purposes, or else supply such charge fluid at an undesirably high pressure. In either case the operation results in large parasitic power losses, and when pressure reducing devices are not used, such arrangements may additionally involve the use of undesirably high pressures in the transmission loop together with the structural problems incident thereto, all of which factors are disadvantageous and objectionable. On the other hand, the use of two separate supply pumps is also objectionable because of the cost and inflexibility thereof, as well as because of the space factor which is quite critical particularly in tractor type vehicles.

It is a principal object of the present invention, therefore, to provide a novel hydrostatic transmission system that readily overcomes the above noted drawbacks of such systems.

Another object is to provide a hydrostatic transmission system employing a dual-stage hydraulic supply pump arranged to provide charge or make-up fluid to a motor-pump unit thereof at one pressure and fluid at a higher pressure to servo-cylinders utilized for swash plate control of the unit, and having means for diversion of excess servo-cylinder fluid to a reservoir source of fluid supply.

A further object is to provide a hydrostatic transmission system utilizing a dual pressure output supply pump and having means for cooling the fluid circulated in the charge fluid circuit thereof.

A still further object is to provide a hydrostatic transmission system utilizing a dual pressure output supply pump and having regulator and relief valve means in the system to permit diversion of excess fluid in the high pressure servo-cylinder circuit to the charge circuit, and to limit pressures in said circuits and in the fluid directed to an oil-cooler to acceptable maximum values.

A yet still further object is to provide a hydrostatic transmission system having the hereinabove noted characteristics and additionally including valving means normally disposed for directing the downstream charge circuit fluid through oil-cooler means but with said valving means being operative in another position for by-passing fluid around the oil-cooler means when the restriction to flow through said oil-cooler exceeds a predetermined maximum value, and in a further position for by-passing fluid to a reservoir upon an increase in restriction to flow in the downstream side of said valving means.

The foregoing and other objects and advantages are attained by the present invention, various novel features of which will be apparent from the description herein and the accompanying drawings disclosing preferred embodiments of the invention and will be more particularly pointed out in the appended claims.

The invention is illustrated in the following drawings wherein:

FIGURE 3 is a fragmentary view of a portion of the proposed system showing an optional arrangement for disposing of the excess servo-cylinder circuit fluid;

Figure 1:
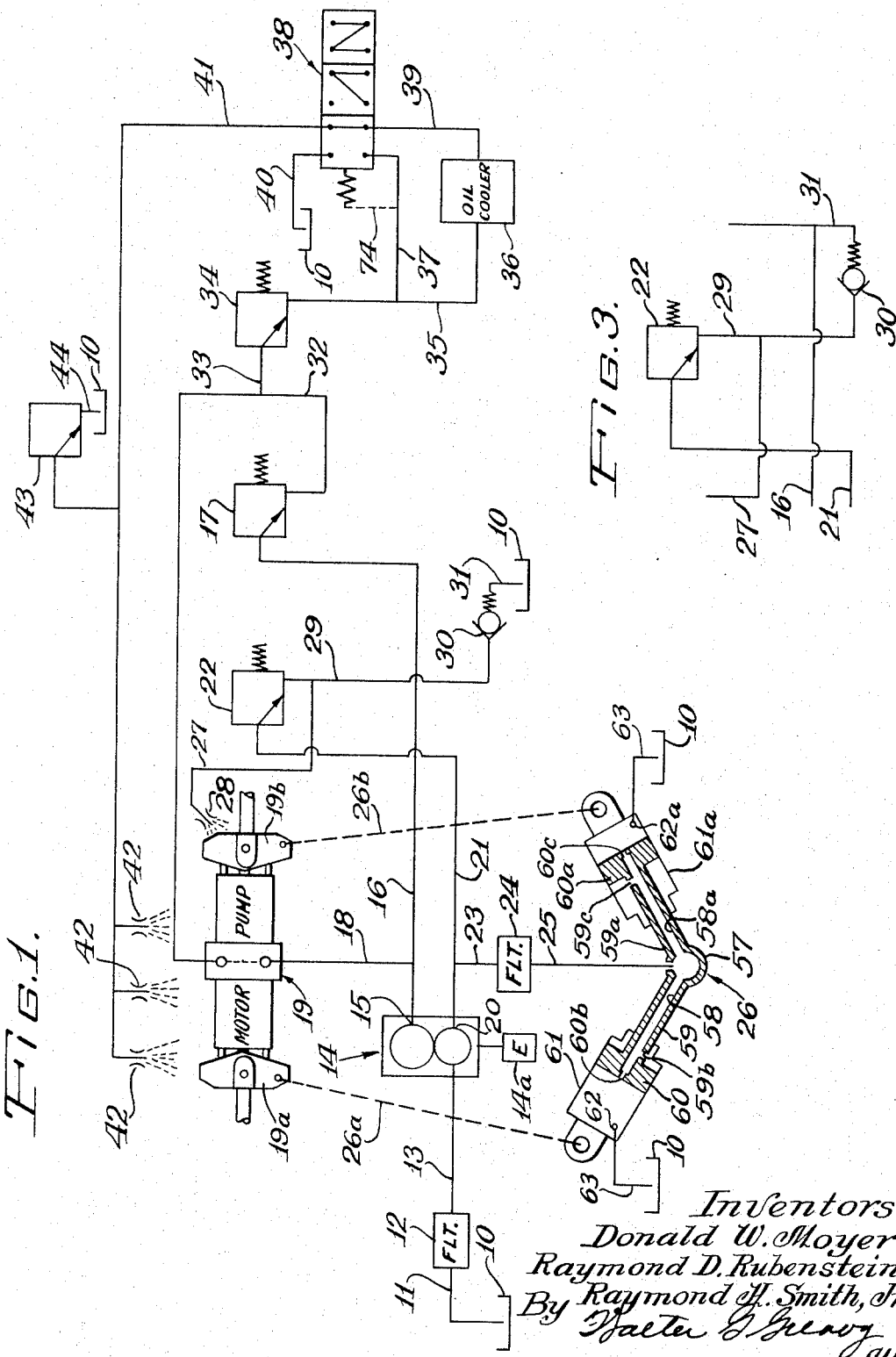
FIGURE 1 is a schematic representation of the proposed hydrostatic transmission system with the components thereof being shown generally schematically.

Referring now to the drawings, where there is presented a general representation of a hydrostatic transmission system of the type customarily incorporated in vehicles for propulsion thereof, it will be seen that only the components of the system pertinent to the present invention are included. It being understood other components may also be employed without deviating from any of the inventive concepts hereof.

A fluid reservoir 10 connects by a passage 11 with the inlet of an oil filter 12 and the outlet thereof connects by a passage 13 with the inlet of a fluid supply pump, indicated generally by reference numeral 14, which may be driven by suitable means such as the engine 14a. This pump, preferably, is of the two-stage slipper type that provides a dual pressure and dual flow output with the higher pressure being associated with the smaller capacity flow outlet and the lower pressure being associated with the larger flow outlet. A pump of this type which has been found to be suitable for such an installation is manufactured and marketed by the TRW Michigan Division of Thompson Ramo Wooldridge.

A first outlet 15, of pump 14, opens into a conduit 16 the opposite end of which connects into a pressure relief valve 17 while an intermediate point of said conduit connects by a conduit 18 with an inlet of a motor-pump unit indicated generally by reference numeral 19. This portion of the system supplies the charge or make-up fluid to the motor-pump unit from pump 14 and together with the outlet circuit of said unit is commonly referred to as the charge circuit. It will be understood of course that the pump thereof will be operatively connected to suitable driving means while the motor will be suitably connected to the equipment or vehicle to be driven thereby.

A second outlet 20, of pump 14, communicates with a conduit 21 the opposite end of which connects into a pressure relief or regulator valve 22 while an intermediate point of the latter conduit connects by a conduit 23 with the inlet of a strainer or filter 24 the outlet of which connects by a conduit 25 with a speed control servo-cylinder mechanism represented in its entirety by reference numeral 26.

The outlet of regulator valve 22 connects by conduit 27 with a nozzle 28 that communicates with the interior of motor-pump unit 19 to spray lubricating fluid thereover, and, by way of a conduit 29, also connects with a relief valve 30 which in turn connects by a conduit 31 with reservoir 10.

The outlet of valve 17 connects by a conduit 32 with an outlet of said motor-pump unit and an intermediate point of the latter conduit connects by a conduit 33 with a regulator valve 34 while the outlet of the latter valve connects by a conduit 35 with an oil-cooler 36 and by a conduit 37 with a cooler by-pass valve represented generally at 38. The outlet of oil-cooler 36 connects by a conduit 39 with valve 38 while an additional outlet of the latter valve connects by conduit 40 with reservoir 10, and another outlet of this valve connects by conduit 41 with a plurality of nozzles, indicated by reference numeral 42, which openly communicates with various portions of the interior of motor-pump unit 19 to aid in the lubrication thereof. An intermediate point of conduit 41 may connect into a relief valve 43 which opens into a conduit 44 that, in turn, communicates with reservoir 10.

Figure 2:
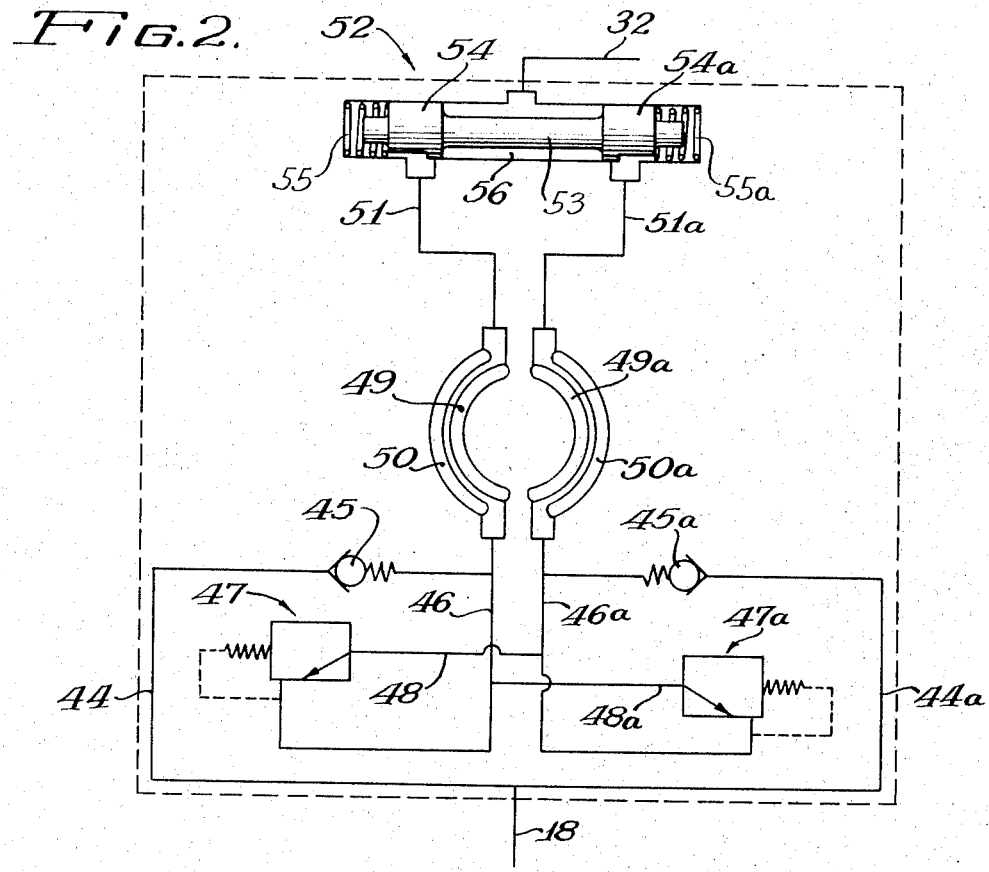
FIGURE 2 is a schematic representation of the hydraulic circuitry through the pump-motor unit component of the system.

Since the motor-pump unit 19 is generally conventional, such, for example, as the hydraulically interconnected and back-to-back arranged motor-pump unit described in the Hann et al. U.S. Patent 3,126,707 and marketed by the Sundstrand Corp., it was felt no extensive elaboration of the details or construction thereof need be included herein. Conduit 18 which connects to an inlet of said unit opens into a pair of conduits 44, 44a (FIGURE 2) which connect into the respective check valve 45, 45a while the outlet sides of the latter valves open into the respective conduits 46, 46a which, in turn, connects at one end thereof into the pilot-operated high pressure relief valves 47, 47a. The outlets of said high pressure relief valves are cross connected by conduits 48a, 48 with the respective inlets of valves 47a, 47 so as to by-pass fluid therebetween upon opening of either one of these relief valves as a result of an excessively high pressure in the associated circuit. The opposite ends of conduits 46, 46a communicate with the kidney-shaped ports 49, 49a and 50, 50a of the respective pump and motor of said unit, and additional conduits 51, 51a communicating with the respective kidney ports connect into opposite ends of a shuttle valve 52. Said shuttle valve which is of conventional construction may include a piston 53 having enlarged heads 54, 54a at opposite ends thereof, and centering springs 55, 55a whereby said piston is maintained centered when the transmission is operating in its neutral position. The outlet or discharge conduit 32 communicates with a chamber 56 formed between the opposite heads 54, 54a of said valve and which chamber upon operation of said valve is adapted to communicate with a respective one of conduits 51, 51a.

It will be appreciated of course, that valves 45, 45a, and 47, 47a together with pump and motor kidney ports 49, 49a and 50, 50a and shuttle valve 52 may be fashioned as part of the motor-pump unit 19, whereupon many of the conduits designated as interconnecting these components may be constituted as passages formed in the casing, housing or valving plate members rather than as separate or individual conduit elements. For simplicity of construction the valve unit 22 may be disposed in the housing embracing supply pump 14, while valves 17, 34 and 38 may be grouped in a single valve body with many of the conduits designated as interconnecting these components being fashioned as passages in the body or housing members thereof.

The inlet conduit 25 opens into an anchor pin 57 which supportably mounts one end of each of the servo-control devices, while centrally disposed passages 58, 58a in the respective piston rods 59, 59a and pistons 60, 60a of said servos communicatively interconnect conduit 25 with the interior chambers of cylinders 61, 61a. Orifice outlets 62, 62a connecting with conduits 63, 63a serve to communicate the respective cylinders with reservoir 10. It will be understood, of course, that the servo-cylinders are operatively connected by suitable means such as indicated schematically at 26a 26b with swash plates 19, 19a of the respective motor and pump components for controlling the position of said plates according to well-known principles of operation of such mechanisms.

As shown in FIGURE 3 it will be seen that the output of check valve 30 may be directed by conduit 31 to conduit 16 to permit diversion of fluid from conduit 29 to conduit 16 whereby excess servo-cylinder circuit fluid may be passed into the charge fluid circuit, if desired, without deviating from any of the pertinent inventive concepts hereof.

Figure 4:
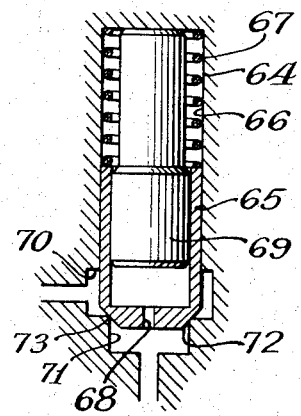
FIGURE 4 is a generally diagrammatic and sectional view of a form of regulator valve incorporated in the proposed system.

The valves 17, 22 and 34, which are shown herein somewhat schematically in FIGURE 1, may be of a conventional construction of the type which permits setting the respective valves to normally remain closed but being operable at a predetermined preselected pressure to thereby provide a form of pressure regulation for the associated hydraulic circuit. One preferred form of such valve, as illustrated in FIGURE 4, shows a generally diagrammatic and sectional view thereof wherein it will be seen a body member 64 receives a sleeve-like piston 65 slidably in a bore 66 therein, while a spring 67 is reactively disposed between said body and one end of said piston. An opening 68 through the closed end of said piston communicates the exterior area of the piston with the interior thereof to provide a hydraulically balanced valve, as is well understood, on the downstream side thereof. A plunger member 69 disposed in the bore 66 is slidably accommodated in the sleeved piston 65 and may function as a stop or abutment for said piston. An inlet port 70 connects with the upstream fluid flow and an outlet port 71 communicates with the downstream side of the flow. The piston 65 may be fashioned with a bevelled surface 72 on one end thereof that may seat against a shoulder 73 in the bore to provide a valve seat which abuttingly receives the bevelled surface of the piston to close the valve and interrupt flow therethrough.

Figure 5:
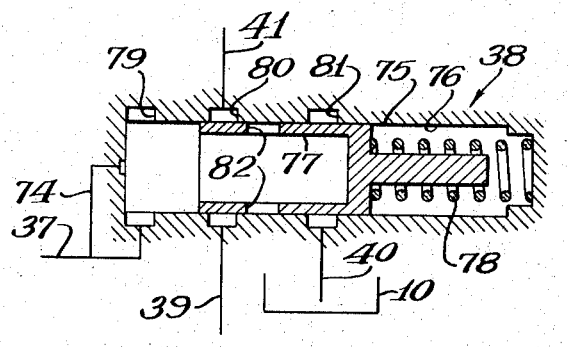
FIGURE 5 is a view similar to the preceding view but showing a form of oil-cooler by-pass valve adaptable for use with the proposed system.

The oil-cooler by-pass valve 38 may be any well-known or conventional three position, four connection spring biased valve which in its normally disposed first position permits flow through from the oil-cooler to portions of the motor-pump unit lubricating circuit, and in a second position permits a by-pass of a portion of the fluid around the oil-cooler, while in a third position causes fluid flow to be diverted back to a reservoir. Conventional pilot operated means, such as represented by the interconnecting line 74, may be employed to provide automatic means for operating the valve responsive to fluid pressures in the conduit 37 which is in open communication with the downstream outlet of regulator valve 34. One preferred form of such valve, as illustrated FIGURE 5, showing a generally diagrammatic and sectional view thereof, includes a body or housing member 75 fashioned with a longitudinal bore 76 that accommodates a sleeve valve element 77 slidably therewithin, while a spring 78 disposed between one end of the valve element and the body urges or biases said element to a first or normal position. Axially spaced annular grooves 79, 80 and 81 in said body and opening into bore 76 connect with the respective conduits 37, 39–41 and 40, and the sleeve valve element 77 includes a plurality of port openings 82 which, in the third position of the valve, are adapted to register with annular groove 81.

OPERATION

The dual pressure supply pump 14 provides charge fluid flow at a low pressure by way of conduits 16 and 18 to the motor-pump unit 19, while fluid flow at a higher pressure is supplied through conduits 21 and 25 to the servo-cylinders 60, 61a. With motor-pump unit 19 operating and the motor thereof being driven by fluid under pressure from the units drive pump fluid is circulated around the transmission loop interconnecting said motor and drive pump of the unit. Under this condition the fluid in the high pressure side of this loop becomes effective for actuating shuttle valve 52, by moving it away from its normally centered position with the transmission in neutral, and moving it to the right or left depending on the tilted position of the swash plates in the motor-pump unit, as is well known, while concomitant therewith the low pressure or return side of said transmission loop operating at a lower pressure becomes effective to permit opening of the corresponding one of check valve 45 or 45a to admit cool make-up or charge fluid from the respective one of the supply lines 44, 44a. With shuttle valve 52 open conduit 32 serves to transfer the excess hot fluid discharged thereinto from the unit to the inlet of regulator valve 34. When the pressure in conduit 32 reaches a predetermined value valve 34 will open to pass the fluid therethrough and thence by way of conduit 35 to oil-cooler 36 and thereafter, by way of conduit 39, valve 38 and conduit 41, to the lubricating spray nozzles 42 in the motor-pump unit. It will be seen, since conduit 16 communicates with relief valve 17, that when the pressure in said conduit rises above a predetermined maximum value, such for instance as when the transmission is operating in neutral, with shuttle valve 52 centered thus restricting discharge therethrough to return conduit 32, the increased pressure in conduit 16 becomes effective for opening valve 17 to thereupon direct said fluid by way of conduit 32 to the inlet of regulator valve 34, where said fluid joins with the flow returning by way of conduit 32 from the motor-pump unit. In this manner a suitable and acceptable pressure is maintained in the charge fluid circuit.

In the event pressure in oil-cooler conduit 35 should rise because of cold oil or some other form of restriction to flow through oil-cooler 36 the resultant pressure build-up in interconnected conduit 37 will become operative to move by-pass valve 38 from a normally maintained first position to a second position wherein a parallel flow by-passing a portion of the flow through the oil-cooler is established thus permitting adequate flow to lubricating conduit 41. However, if such restriction further increases, or a back pressure develops in conduit 41 by virtue of abnormal restriction in nozzles 42 the resultant pressure build-up in conduit 37 becomes effective to move valve 38 to a third position which, as will be seen, directs fluid flow from conduits 35 and 37 by way of conduit 40 to reservoir 10, thus virtually by-passing the oil-cooler as well as the associated portion of the lubricating conduit circuit.

The fluid flow from supply pump 14 through conduits 21, 23 and 25 to the speed and direction control servo-cylinders being at a higher pressure than the fluid flow in the charge circuit is highly advantageous since it permits the utilization of more compactly designed servo-mechanisms. Fluid entering through anchor pin 57 from conduit 25 divides and passes through the passages 58, 58a in the respective piston rods 59, 59a and thence through the orifices 59b, 59c in said rods and through the orifices 60b, 60c in pistons 60, 60a into the cylinders 61, 61a after which said fluid is discharged through the variable orifices 62, 62a and conduits 63, 63a to the reservoir. Movement of the cylinders 61, 61a is caused by a change in differential pressures across the servo-pistons, and this occurs when cam controlled orifices 62, 62a are increased or decreased in size thereby varying the outflow and causing the resultant pressure drop in the piston head end of the cylinders to change thus changing the differential pressure. This change permits the servos to expand or contract for moving the swash plates to correspond therewith. Suitable means such, for instance, as the manually controlled cam plate device illustrated in the aforesaid mentioned Hann et al. Patent 3,126,707, may be used to control the discharge through the variable orifices 62, 62a and thereby position the tilt of the respective swash plates 19a, 19b of the motor-pump unit 19 as desired for the various speed and directional control conditions of operation of the transmission. Conduit 21 which carries fluid from supply pump 14 to the servo-cylinders also connects into the inlet of regulator valve 22 and when the pressure in said conduit rises above a predetermined preselected value said regulator valve opens and discharges into conduits 27 and 29 thereby providing a form of pressure regulation for the servo-cylinder circuit. The discharge from the latter valve is directed by way of conduit 27 into nozzle 28 where it effectively spray lubricates a portion of the interior of motor-pump unit 19, while any excess of said servo-cylinder circuit fluid, preferably, is directed by way of conduits 29, 31 and relief valve 30 into reservoir 10. However, in the modified conduit arrangement illustrated in FIGURE 3 such excess servo-cylinder circuit fluid may be directed into the lower pressure charge fluid circuit by way of conduit 16.

While the regulator valves 22 and 34 and relief valve 17 may be designed and arranged to operate at various preselected pressures, it has been found that very satisfactory operation of the proposed transmission system is attained when regulator valve 22 is set to limit the pressure to 400 p.s.i. in the servo-cylinder circuit, and relief valve 17 is set to limit pressure to 200 p.s.i. in the upstream side of the charge circuit while regulator valve 34 is set to maintain a minimum pressure of 50 p.s.i. in the downstream side of the latter circuit.

The high pressure relief valves 47, 47a which are generally conventional are provided to open and by-pass fluid from the pressure to the return side of the transmission loop upon development of an inordinately high pressure therein.

From the above it will be seen the proposed arrangement provides a hydrostatic transmission system offering the following advantageous features: The larger volume requirement, i.e., the charge flow, can be supplied at optimum pressure, since servo-pressure requirements are no longer a factor, thus reducing the parasitic power loss. Since the lower charge pressure results in a lower total system pressure in the main loop of the transmission structural loading and system leakage complications are reduced. Inasmuch as the servo-pressure can be set higher than would be practical with a single make-up pump more flexibility is provided for servo design.

While certain representative embodiments and details have been shown for the purpose of illustrating the invention, it will be apparent to those skilled in this art that various changes and modifications may be made therein wthout departing from the spirit or scope of the invention.

What is claimed is:

1. In a hydrostatic transmission system having a variable displacement pump and a variable displacement motor hydraulically interconnected to form a closed circuit unit, an oil-cooler for cooling excess heated fluid discharged from said pump and motor unit, and hydraulic servo-mechanisms operative for selectively controlling displacement of the pump and motor elements of said unit, the combination therewith of a reservoir source of fluid, a dual pressure output fluid supply pump, a plurality of control valves, conduits communicatively interconnecting said supply pump with said source of fluid and with said pump and motor unit and servo-mechanisms and with said plurality of control valves, said supply pump being operative for supplying make-up fluid to said pump and motor unit at one pressure and at a higher pressure to said servo-mechanisms for operation thereof, said plurality of control valves being operative one valve for limiting pressure of make-up fluid supplied said pump and motor unit from said supply pump, one valve for limiting pressure of fluid supplied said servo-mechanisms from said supply pump and one valve for maintaining a minimum pressure of the fluid supplied said oil-cooler, by-pass valve means, additional conduit means communicatively interconnecting said by-pass valve, said oil-cooler, a selected one of said plurality of valves, said pump and motor unit and said reservoir source of fluid, and having said by-pass valve means operative for by-passing fluid around said oil-coiler.

2. The invention according to claim 1 but further characterized in that said plurality of valves includes first, second and third valves wherein an inlet of said first valve communicatively connects with said supply pump and said servo-mechanisms and an outlet thereof communicates with said pump and motor unit for lubrication thereof and with said reservoir source of fluid, and an inlet of said second valve communicatively connects with said supply pump and with an inlet of said pump and motor unit and an outlet thereof communicates with an outlet of said pump and motor unit and with an inlet of said third valve, and an outlet of said third valve communicates with said oil-cooler and said bypass valve means.

3. The invention according to claim 2 but further characterized in that said supply pump is fashioned with a high pressure outlet and a low pressure outlet and wherein the inlet of said second valve communicatively interconnects with said low pressure outlet and the inlet of said first valve communicatively interconnects with said high pressure outlet.

4. The invention according to claim 2 but further characterized in that the outlet connection of said first valve includes a unidirectional relief valve therein operative to permit passage of fluid therethrough to said reservoir source of fluid while restricting fluid flow therethrough in an opposite direction.

5. The invention according to claim 4, but further characterized in that the outlet of said relief valve is communicatively connected to an inlet of said pump and motor unit whereby excess servo-mechanism circuit fluid may be diverted into the make-up circuit fluid for said pump and motor unit.

6. The invention according to claim 1 and further characterized in that said supply pump is constituted as a unitary pump with a single inlet and a pair of outlets, and wherein the fluid output through one of said outlets is delivered to said pump and motor unit at a low pressure while the fluid output through the other of said outlets is delivered at a high pressure to said servo-mechanisms.

7. In a hydrostatic transmission system having a variable displacement pump and a variable displacement motor hydraulically interconnected to form a closed circuit unit, an oil-cooler for cooling excess heated fluid discharged from said pump and motor unit, and hydraulic servo-mechanisms operative for selectively controlling displacement of the pump and motor elements of the unit, the combination therewith of a reservoir source of fluid, a fluid supply pump having an inlet communicatively connected with said source of fluid and having a pair of outlets providing fluid flow at different pressures, first, second and third control valve means, and by-pass valve means, charge circuit conduit means communicatively interconnecting one pressure outlet of said supply pump with an inlet of the pump and motor unit and with an inlet of said second control valve and an outlet of the latter valve with an inlet of said third control valve and with an outlet of the pump and motor unit, servo-circuit conduit means communicatively interconnecting the other of said pressure outlets of said supply pump with said servo-mechanisms and with an inlet of said first control valve and an outlet of the latter valve with said reservoir source of fluid and with the interior of the pump of the pump and motor unit for lubrication thereof, cooler circuit conduit means communicatively interconnecting an outlet of said third control valve with said oil-cooler and said by-pass valve and connecting the latter valve with said oil-cooler and said reservoir source of fluid and with the interior of the pump and motor unit for lubrication thereof, said first control valve being operative responsive to pressure in the servo-circuit for limiting pressure in the latter circuit to a predetermined value, said second control valve being operative responsive to pressure on an upstream side of the charge circuit for limiting pressure in the charge circuit to a predetermined value, said third control valve being operative responsive to pressure on a downstream side of the charge circuit for maintaining a predetermined pressure in the cooler circuit, and having said by-pass valve means operative responsive to pressure in the cooler circuit for by-passing fluid around said cooler.

8. The invention according to claim 7 but further characterized in that said by-pass valve means is selectively operative in a first position thereof for directing fluid from said oil-cooler to the pump and motor unit for lubrication thereof, and in a second position for by-passing said oil-cooler and diverting fluid from said third control valve to the pump and motor unit for lubrication thereof, and in a third position for diverting fluid from said third control valve to said rervevoir source of fluid.

9. The invention according to claim 7 but further characterized in that the servo-circuit conduit means communicatively interconnects the other of said pressure outlets of said supply pump with said servo-mechanisms and with an inlet of said first control valve and an outlet of the latter valve with the interior of the pump of the pump and motor unit for lubrication thereof and with the inlet of a unidirectional relief valve and the outlet of said relief valve with said charge circuit conduit means whereby excess servo-circuit fluid is diverted to the charge circuit upon opening of said relief valve.

No References Cited.

EDGAR W. GEOGHEGAN, *Primary Examiner.*